(No Model.)
L. C. JAQUES.
SHINGLING BRACKET.
No. 260,872. Patented July 11, 1882.
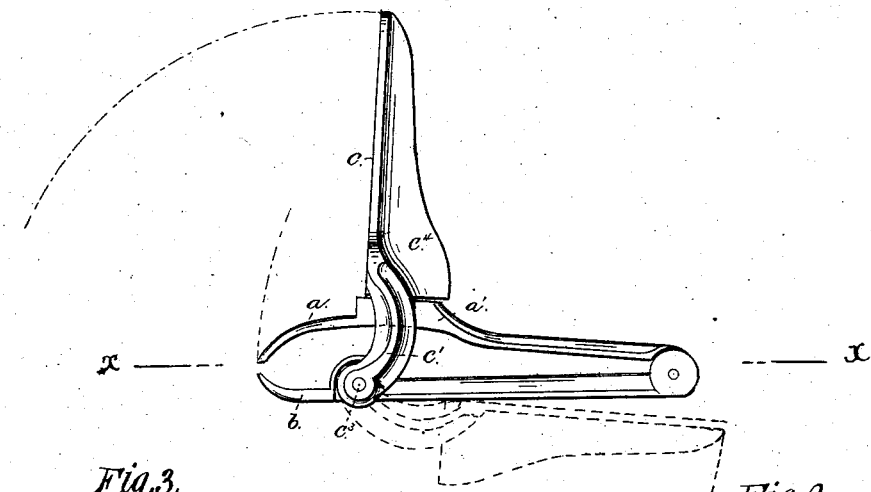
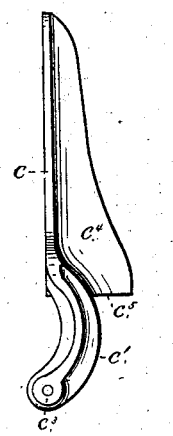
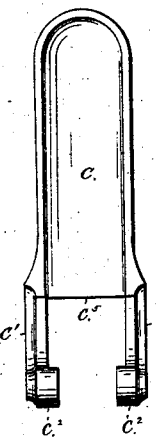
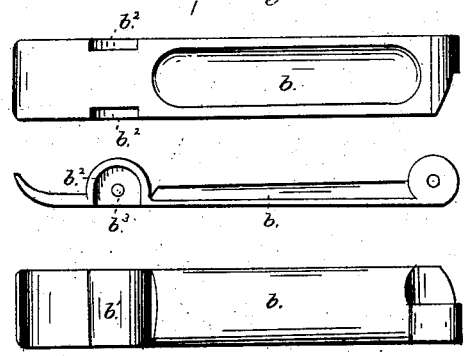
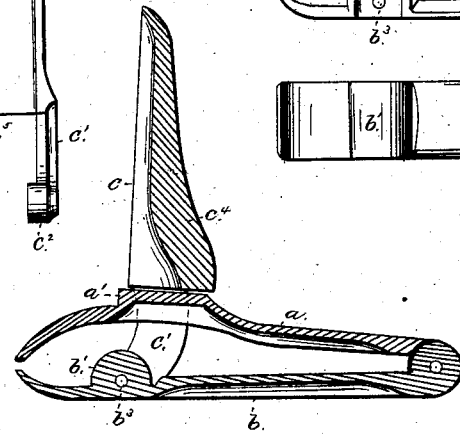
Witnesses:
P. B. Turpin
F. W. Wheat
Inventor:
Luther C. Jaques
By R. S. & A. P. Lacey Att'ys

UNITED STATES PATENT OFFICE.

LUTHER C. JAQUES, OF ROCK RAPIDS, IOWA.

SHINGLING-BRACKET.

SPECIFICATION forming part of Letters Patent No. 260,872, dated July 11, 1882.

Application filed April 6, 1882. (No model.)

*To all whom it may concern:*

Be it known that I, LUTHER C. JAQUES, a citizen of the United States, residing at Rock Rapids, in the county of Lyon and State of Iowa, have invented certain new and useful Improvements in Shingling-Brackets, of which the following is a specification, reference being had therein to the accompanying drawings.

My invention relates to improvements in shingling-brackets, and has for its object to furnish a bracket that will be easy of application, and in which the increased weight applied to it will increase the "bite" or hold of its jaws on the shingle, and one which may be folded in convenient shape for carrying, as will be hereinafter fully set forth.

It consists essentially in the combination, with the two pivoted jaws, of a bifurcated bar pivotally secured to one of the jaws, and adapted to swing up over the open ends of the pivoted jaws and bear on the opposite jaw and clamp the said jaws, substantially as hereinafter described, and pointed out in the claims.

In the drawings, Figure 1 is a side view, and Fig. 2 a vertical section, of a bracket constructed according to my invention, and in Figs. 3 and 4 I show detail views of parts thereof.

$a$ is the upper and $b$ the lower jaws. They are hinged together at one end, as shown. The opposite end I call, for convenience of reference, the biting end. On the top of the under jaw, $b$, near the biting end thereof, I form the semicircular ridge $b'$. In the ends of this ridge $b'$, at each side of the jaw, I cut the semicircular mortise, so as to leave the rim or curved bearing $b^2$ extended outward over the tops of said mortise, as shown. Through this rib I form the bolt-hole $b^3$, as shown. On the top of the jaw $a$, near the biting end, I form the projection or bearing-piece $a'$. The top of this bearing-piece is beveled slightly from front to rear compared with a line drawn about as indicated by line $x$ $x$, Fig. 1.

$c$ is the clamping-bar. The lower side of this bar I bifurcate and form the arms $c'$ $c'$. From the inner side of the lower end of the arms $c'$, I project the circular lugs $c^2$, curved correspondingly to the curve on the under side of the rim or bearing $b^3$. Through the center of these lugs I form the bolt-hole $c^3$. The lower side of the main portion of the bar $c$, together with the extension $c^4$, forms a bearing, $c^5$, which I bevel from front to rear correspondingly to the bevel on the projection or bearing-piece $a'$, as shown in Fig. 1. This beveled bearing, in connection with the beveled bearing $a'$, prevents the slipping forward of the bevel-bar and secures a greater tightening with the increased weight applied to the said lever-bar, as described.

In the operation of my device I secure the bar $c$ to the lower pivoted jaw by placing the bar $c$ in the position shown in Figs. 1 and 2 and passing a bolt or pin through the openings $c^3$ $b^3$. Supposing the bar or lever $c$ to be in the position on the under side of the pivoted jaws as indicated in dotted lines, Fig. 1, I then bring the said bar forward and above the upper jaw, $a$, far enough to permit the opening of the jaws sufficiently to admit the large end of a shingle to be placed therebetween. I then raise the lower end of a shingle, the upper or thin end of which has been nailed to the sheathing, and place the lower jaw, $b$, under the lower end of shingle, then by pressing the bar or lever $c$ back till it reaches a line about right angle to the jaws the said jaws will be clamped securely to the shingle. I secure several of these brackets in the manner described in a line across the roof, and place a board or piece of scantling against the upper side of the lever, which forms a safe staging for the workmen. The greater the number of workmen, and consequently the greater the weight bearing on the bar or lever $c$, the greater is the bite of the jaws of my bracket and the more securely the same is held to the roof.

By bifurcating my lever-bar and securing it to the under jaw I am able to turn the said lever to the position shown in dotted lines, Fig. 1, which is convenient in carrying or packing the brackets for shipping.

It will be understood that it is not necessary that the bar $c$ should be bifurcated, as it could be constructed with a single arm pivoted to the under bar, $b$, and having the shoulder or bearing $c^5$ projected laterally therefrom over the bearing $a'$. I prefer, however, the construction shown and hereinbefore described.

I am aware that patent has been granted G. W. Spaulding and G. R. Smith, dated June 22, 1869, in which are shown two pivoted jaws clamped to the shingle by a cam-lever which serves as a rest for the beam; and I do not broadly claim such construction as my invention.

Having thus described my invention, what I claim, and desire to secure by Letters Patent, is—

1. The combination, substantially as hereinbefore set forth, with the hinged jaws $a$ and $b$, of the lever-bar $c$, pivoted to the under jaw and arranged to turn up over the biting end of the said jaws and bear on the upper end of the said jaws and secure the same to the shingle, as set forth.

2. The combination, with the jaw $a$, having beveled projection $a'$ and hinged to the jaw $b$, of the lever-bar $c$, pivoted to the jaw $b$ and constructed with the bearing $c^5$, beveled correspondingly to the bevel on projection $a'$, and arranged to bear on said projection, as set forth, and for the purposes described.

In testimony whereof I have affixed my signature in presence of two witnesses.

LUTHER C. JAQUES.

Witnesses:
F. W. WHEAT,
SAML. C. GREENWOOD.